(12) United States Patent
Weimer et al.

(10) Patent No.: US 10,400,309 B2
(45) Date of Patent: Sep. 3, 2019

(54) CARBOTHERMAL REDUCTION REACTOR SYSTEM, COMPONENTS THEREOF, AND METHODS OF USING SAME

(71) Applicant: The Regents of the University of Colorado, a body corporate, Denver, CO (US)

(72) Inventors: Alan W. Weimer, Niwot, CO (US); Aaron Palumbo, Westminster, CO (US); Illias Hischier, Boulder, CO (US); Boris A. Chubukov, Boulder, CO (US); Scott C. Rowe, Boulder, CO (US); Richard Fisher, Denver, CO (US); Arto J. Groehn, Boulder, CO (US)

(73) Assignee: THE REGENTS OF THE UNIVERSITY OF COLORADO, A Body Corporate, Denver, CO (US)

( * ) Notice: Subject to any disclaimer, the term of this patent is extended or adjusted under 35 U.S.C. 154(b) by 530 days.

(21) Appl. No.: 14/915,573

(22) PCT Filed: Aug. 28, 2014

(86) PCT No.: PCT/US2014/053273
§ 371 (c)(1),
(2) Date: Feb. 29, 2016

(87) PCT Pub. No.: WO2015/031682
PCT Pub. Date: Mar. 5, 2015

(65) Prior Publication Data
US 2016/0208362 A1 Jul. 21, 2016

Related U.S. Application Data

(60) Provisional application No. 61/871,758, filed on Aug. 29, 2013.

(51) Int. Cl.
*C22B 26/22* (2006.01)
*C01B 21/06* (2006.01)
(Continued)

(52) U.S. Cl.
CPC ............ *C22B 26/22* (2013.01); *B01D 53/002* (2013.01); *C01B 21/06* (2013.01);
(Continued)

(58) Field of Classification Search
CPC . C01B 21/06; C01B 21/0685; C01B 21/0726; C22B 19/20; C22B 1/14; C22B 26/22; C22B 5/10; C22B 5/16
See application file for complete search history.

(56) References Cited

U.S. PATENT DOCUMENTS 4,105,192 A * 8/1978 Ishimatsu ................. C22B 5/04
266/149
5,078,789 A * 1/1992 Abodishish ............. C22B 34/10
266/149
(Continued)

FOREIGN PATENT DOCUMENTS

WO 2014067664 A2 5/2014

OTHER PUBLICATIONS

WIPO; Notification Concerning Transmittal of the International Search Report ("ISR") and the Written Opinion ("WO") of the International Searching Authority, or the Declaration, ISR and WO dated Dec. 5, 2014 in corresponding International Application No. PCT/US14/53273.

*Primary Examiner* — Lois L Zheng
(74) *Attorney, Agent, or Firm* — Holzer Patel Drennan

(57) ABSTRACT

Methods, systems, and components suitable for carbothermal reduction processes are disclosed. Exemplary systems include a reactor, such as hybrid solarthermal-electric reactor, a solar thermal reactor, an electric reactor, or a reactor
(Continued)

heated by gas combustion, a pellet source, a gas reactant source, and a vacuum source. The reactor can operate as a moving bed or pseudo moving bed reactor.

14 Claims, 9 Drawing Sheets

(51) Int. Cl.
    *C01B 21/068*     (2006.01)
    *C01B 21/072*     (2006.01)
    *C22B 5/10*     (2006.01)
    *C22B 19/20*     (2006.01)
    *B01D 53/00*     (2006.01)
    *C22B 1/14*     (2006.01)
    *C22B 5/16*     (2006.01)

(52) U.S. Cl.
    CPC ...... *C01B 21/0685* (2013.01); *C01B 21/0726* (2013.01); *C22B 1/14* (2013.01); *C22B 5/10* (2013.01); *C22B 5/16* (2013.01); *C22B 19/20* (2013.01)

(56) References Cited

U.S. PATENT DOCUMENTS

| | | |
|---|---|---|
| 5,338,523 A | 8/1994 | Krstic |
| 5,370,854 A | 12/1994 | Henley et al. |
| 5,803,947 A * | 9/1998 | Engell ................ C01F 5/02 |
| | | 420/129 |
| 8,420,032 B1 | 4/2013 | Ermanoski |
| 2013/0266502 A1 | 10/2013 | Lichty et al. |

* cited by examiner

CARBOTHERMAL REDUCTION REACTOR SYSTEM, COMPONENTS THEREOF, AND METHODS OF USING SAME

CROSS REFERENCE TO RELATED APPLICATIONS

This application is the national stage entry of International Application No. PCT/US2014/053273, filed Aug. 28, 2014, which claims the benefit of U.S. Provisional Application No. 61/871,758, filed Aug. 29, 2013, the contents of which are hereby incorporated herein by reference to the extent such contents do not conflict with the present disclosure.

STATEMENT REGARDING FEDERALLY SPONSORED RESEARCH OR DEVELOPMENT

This invention was made with government support under grant number DE-AR0000404 awarded by the U.S. Department of Energy. The government has certain rights in the invention.

FIELD OF INVENTION

The present disclosure generally relates to reactor systems and components thereof. More particularly, the disclosure relates to reactor systems suitable for carbothermal reduction of materials, to components of the systems, and to methods of using the systems and components.

BACKGROUND

Carbothermal reduction reactor systems can be used for a variety of applications. For example, carbothermal reduction reactor systems can be used to obtain metals or ceramic materials from, for example, metal oxides.

Generally, such processes require a significant amount of heat to obtain desired reaction temperatures. Accordingly, the reactor systems are relatively expensive to operate. In addition, the reactors typically cannot run in as a continuous process, thus requiring additional time and expense to obtain desired products. Accordingly, improved carbothermal reduction reactors, systems, components thereof, and methods of using the systems and components are desired.

SUMMARY OF THE DISCLOSURE

Various embodiments of the disclosure relate to reactors and methods that can be used for, for example, carbothermal reduction of materials, and to components of such systems. While the ways in which the present disclosure addresses drawbacks of prior methods, reactors, and components are discussed in more detail below, in general, the methods, systems, and components of the present disclosure provide components, reactors, systems and methods that can use less energy than traditional reactor systems and methods that are used for the same or similar processes.

In accordance with various exemplary embodiments of the disclosure, a system for carbothermal reduction (e.g., of a metal oxide) includes a reactor comprising a reaction vessel such as a reaction tube, a pellet source coupled to the reaction vessel (e.g., a first end of the reaction vessel), optionally a gas reactant source comprising a reactant gas coupled to the reaction vessel (e.g., a second end of the reaction vessel), and a vacuum source coupled to the reaction vessel. The reactor can include a solarthermal reactor, a hybrid solarthermal reactor (e.g., gas and/or electric and solar reactor), an electric reactor, a combustion gas (e.g., natural gas) heated reactor, or other suitable reactor—e.g., in which heat is applied to or external to the reaction vessel. In accordance with various aspects of these embodiments, the pellet source includes pellets comprising a metal oxide and carbon material. In accordance with further aspects, the pellets flow in a first direction through the reaction vessel and a product gas (e.g., comprising metal vapor and CO) flows a second direction through the reaction vessel, wherein the first direction and the second direction are different—e.g., opposite or countercurrent to each other. In accordance with further aspects, the reactor operates as a moving bed or pseudo moving bed reactor, which allows continuous or semi-continuous operation of the reactor. Exemplary systems can also include a condenser coupled to the reactor to facilitate collection of products from the system. In accordance with further aspects, the reactor operates at subatmospheric pressure, which allows desired reactions to take at lower temperatures.

In accordance with additional exemplary embodiments of the disclosure, a method of reducing (e.g., to produce a condensed metal or non-oxide metal material) from a metal oxide includes the steps of providing to a reactor pellets comprising the metal oxide and a carbon material, exposing the pellets to a reduction process (in accordance with exemplary aspects of these embodiments, the reduction process produces a product gas flowing in a direction that is different from a direction of flow of the pellets (e.g., in a countercurrent direction)), and using a carbothermal process, reducing the metal oxide to a metal or other non-oxide material to form a desired product. The method can additionally include one or more steps of: forming the pellets, condensing metal vapors, and/or refining or purifying the product. Exemplary methods can include a step of in situ separation of gas-phase products from residual solids in the reaction vessel. In accordance with exemplary aspects of these embodiments, the step of exposing the pellets to a reduction gas occurs at subatmospheric pressure, which allows the reaction to take place at lower temperatures. In accordance with further exemplary aspects, the reactor includes a solarthermal reactor, a hybrid solarthermal reactor (e.g., gas and/or electric and solar reactor), an electric reactor, a combustion gas (e.g., natural gas) heated reactor, or other suitable reactor, such as those described herein.

In accordance with further exemplary embodiments of the disclosure, a hybrid solarthermal reactor that can be heated using solarthermal energy and an alternative energy source (such as resistive heating/electricity, gas combustion, or the like) is provided. The reactor can be used for, e.g., thermochemical processes such as, but not limited to, pyrolysis, gasification, carbothermal reduction, redox chemistry with metal-oxides, and separation of metals. For example, exemplary hybrid solarthermal reactors and systems described herein can be used for reduction of metal oxides with carbon to form, for example, metals or non-oxide ceramics, such as silicon carbide, tungsten carbide and boron carbide. Further yet, the combined reduction with carbon and nitridation with nitrogen or ammonia can be used to produce nitride ceramics, such as aluminum nitride and silicon nitride. Even further, it is possible to use a hybrid solarthermal reactor operating 24/7 to pyrolyze or gasify biomass in the presence or lack of additive methane; or to thermally reduce an active metal oxide so that a subsequent oxidation reaction with water or carbon dioxide can be used to effectively split water or carbon dioxide producing hydrogen or carbon monoxide gas. It is also possible to crack methane, producing hydrogen and carbon black. Exemplary reactors can be operated using only solar energy when enough solar energy is available, operate only using the alternative energy source, or operate using some combination of the energy sources.

Exemplary solarthermal reactors include a solarthermal receiver shell comprising a window assembly, a reaction vessel, a sealed space between an exterior of the reaction vessel and an interior of the solarthermal receiver shell, and a resistive heating element. In accordance with another set of exemplary embodiments of the invention not requiring a protective inert or compatible gas atmosphere within the solar receiver, a hybrid solarthermal electric reactor includes: a solarthermal receiver shell without a window assembly, a reaction vessel, a space between an exterior of the reaction vessel and an interior of the solarthermal receiver shell, and a resistive heating element. As set forth in more detail below, exemplary reactors may not need a window or an inert gas when operating at continuous temperatures of about 1650° C. or less. In these cases, the reactor may include an area that is open to the atmosphere and the reaction vessel and the resistive heating element may desirably be formed of material that is oxidation resistant under the reactor operating conditions. At higher operating temperature, the reactor may desirably include a window and an inert or compatible gas in the sealed space. In accordance with various aspects of these embodiments, the resistive heating element may form part or all of the reaction vessel or can surround the reaction vessel. In accordance with various aspects of these embodiments, the reaction vessel comprises a pseudo-moving bed reactor or a transport vessel reactor. The reactor may additionally include a radiation absorbing thermal energy carrier, such as carbon particles, within the reaction vessel. The resistive heating element may be formed of refractory material, such as molybdenum silicide, silicon carbide, or graphite (when an inert or compatible (non-oxidizing) gas is in the sealed space). The reaction vessel may be formed of refractory material, such as graphite, silicon carbide, alumina, zirconia, molybdenum silicide, or coated graphite refractory materials such as silicon carbide coated graphite. Again, selection of graphite may be avoided when the reaction vessel is exposed to an oxidizing environment. In accordance with further aspects, the reactor includes one or more solarthermal receiver shells, each of which may comprise one or more materials selected from the group consisting of insulating materials (e.g., graphite (e.g., when not exposed to an oxidizing environment), zirconia, silica, alumina), reflective materials, and solar radiation absorptive material. In accordance with further aspects, the hybrid solarthermal reactor includes a retractable radiation shield. In accordance with further exemplary aspects of these embodiments, the hybrid solarthermal reactor further includes a redox reactor vessel within the reaction vessel. Exemplary reactors described herein can operate at temperatures ranging from about 1000° C. to about 2400° C., and can be operated up to 24 hours/day, seven days/week.

In accordance with additional exemplary embodiments of the disclosure, a system includes one or more reactors as described herein. The system may further include a metal (e.g., magnesium) condenser—e.g., comprising a moving bed of metal (e.g., magnesium) particles. The system may also include a "hercynite cycle" or redox reactor to, for example, form hydrogen or carbon monoxide, or both, that can (for the case of hydrogen) be blended with carbon monoxide produced from a carbothermal reduction reaction in the reaction vessel to produce syngas as one or more products of the reactor. Additionally or alternatively, the system may include one or more primary and/or one or more secondary solar concentrators in order to increase solar concentration and, hence, temperature within the reactor. Additionally or alternatively, exemplary systems include a pellet source to provide pellets to a reaction vessel. In these cases, the system can include pellet formation apparatus, such as the apparatus described herein.

In accordance with yet additional exemplary embodiments, a method includes the steps of providing a reactor as described herein, providing a feed stream, exposing the feed stream to a gasification or pyrolysis reaction within the reaction vessel to form one or more products, and exposing at least one of the one or more products to products of a water-splitting or carbon dioxide-splitting process. In accordance with other exemplary embodiments, a method includes the steps of providing a reactor as described herein, providing a feed stream comprising a mixture of metal (e.g., magnesium) oxide and carbon, and exposing the feed stream to heat so as to undergo a carbothermal reduction reaction within the reaction vessel to form one or more products including metal and carbon monoxide. In accordance with various aspects of these embodiments, the method further comprises a step of recycling one or more products, such as CO. In accordance with further aspects, the method further comprises a step of generating steam, which may be used to form electricity or for further redox reactions. At high enough temperatures, typically exceeding 1200° C. to 1400° C., it is also possible to drive an Air Brayton cycle to generate electricity. The method may further include applying concentrated solar energy from one or more solar concentrators to one or more reactors.

In accordance with yet additional exemplary embodiments of the disclosure, a condenser to condense products is provided. The condenser and methods of using the condenser described herein may be used in a variety of applications where one or more vapor products are cooled to below either their boiling or melting point for a given pressure. Exemplary condensers operate below atmospheric pressure—e.g., greater than 0.001 atm and below one atmosphere. The condenser can be used to condense and collect metal vapors such as those produced via carbothermal reduction, and any other compound whose presence is a direct result of high temperature chemistry, resulting in the formation of a vapor or gas that is subsequently cooled.

Both the foregoing summary and the following detailed description are exemplary and explanatory only and are not restrictive of the disclosure or the claimed invention.

BRIEF DESCRIPTION OF THE DRAWING FIGURES

A more complete understanding of exemplary embodiments of the present disclosure can be derived by referring to the detailed description and claims when considered in connection with the following illustrative figures.

Figure 7:
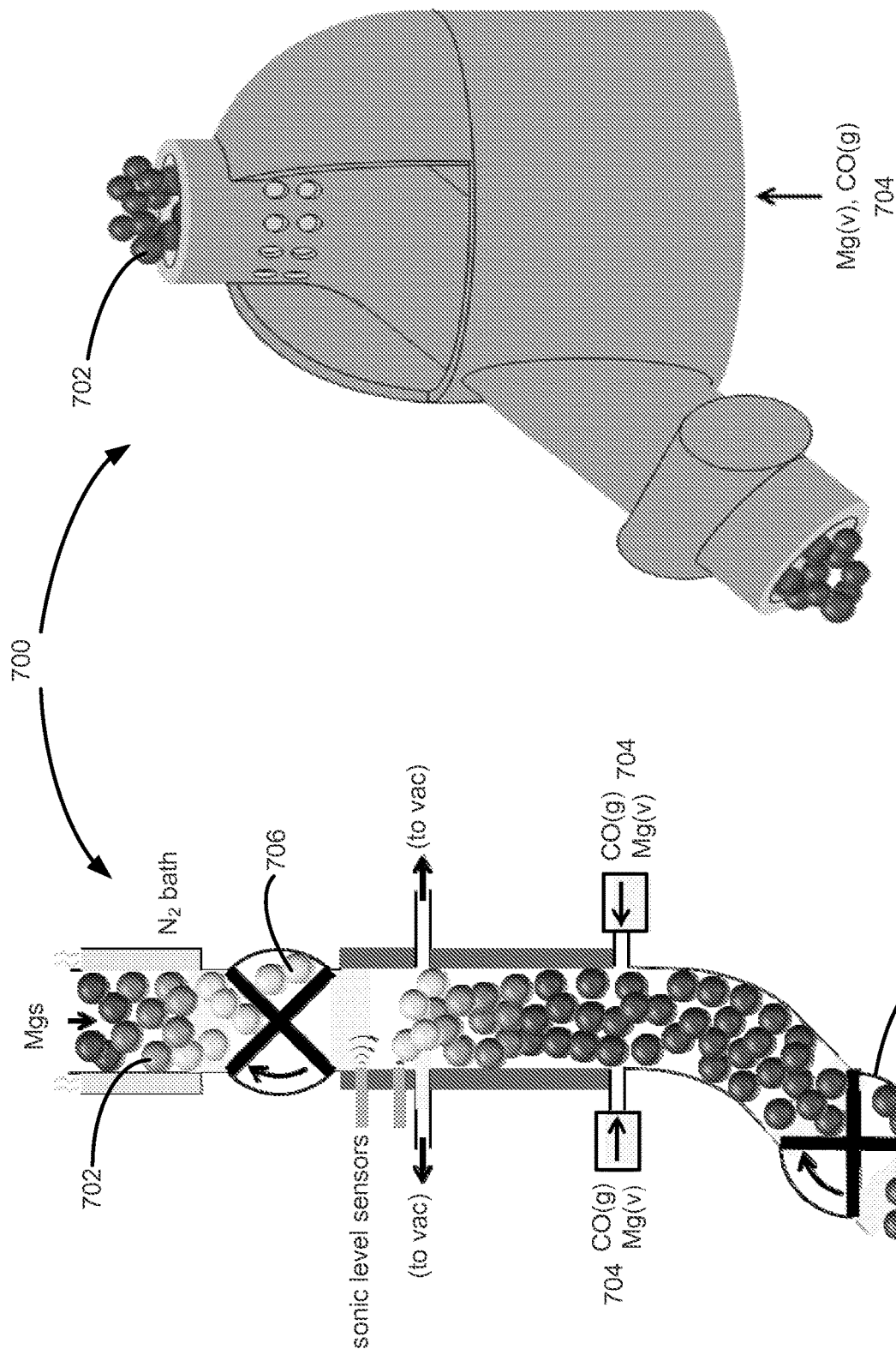

FIGS. 7(a) and 7(b) illustrate a condenser in accordance with further exemplary embodiments of the disclosure.

Figure 8:
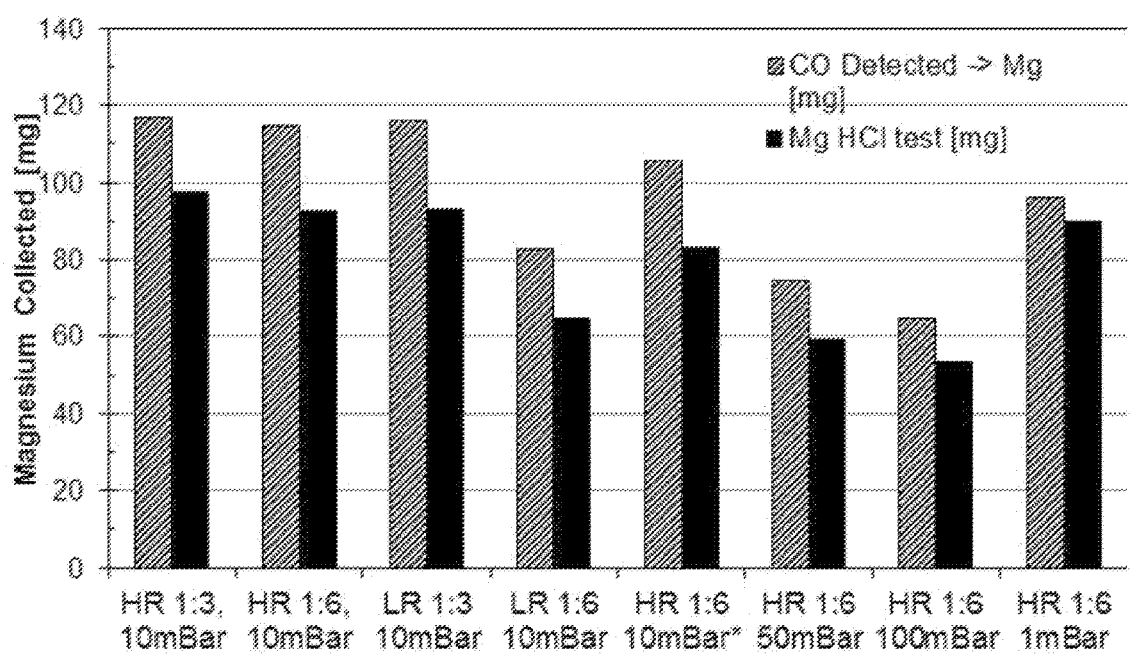

FIG. 8 illustrates exemplary quantities of metal recovered in accordance with further exemplary embodiments of the disclosure.

FIGS. 9(a)-9(d) illustrate XRD graphs of metal obtained using exemplary systems and methods of the present disclosure.

It will be appreciated that elements in the figures are illustrated for simplicity and clarity and have not necessarily been drawn to scale. For example, the dimensions of some of the elements in the figures may be exaggerated relative to other elements to help to improve the understanding of illustrated embodiments of the present disclosure.

DETAILED DESCRIPTION OF PREFERRED EMBODIMENTS OF THE INVENTION

The description of exemplary embodiments of the present disclosure provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

The present disclosure describes exemplary reactors, systems, components thereof, and methods, exemplary pellet formation methods, exemplary hybrid solarthermal reactors and systems, and exemplary condensers. The reactors, systems, components (e.g., condensers), and methods may be used for a variety of applications, and are conveniently described below in connection with carbothermal reduction of metal oxides.

Figure 1:
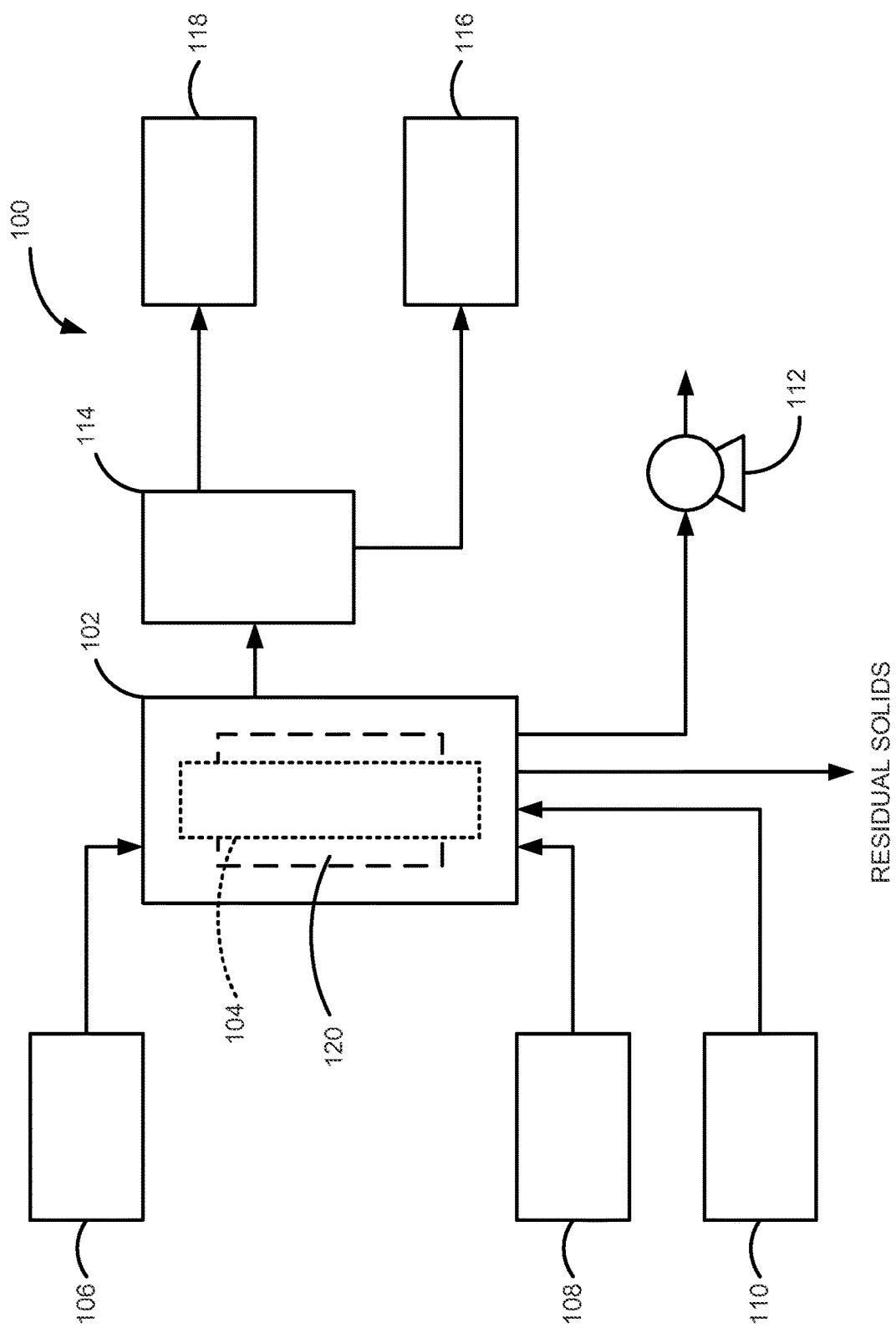
FIG. 1 illustrates an exemplary system suitable for carbothermal reduction of material in accordance with exemplary embodiments of the disclosure.

FIG. 1 illustrates an exemplary system 100 for carbothermal reduction of a metal oxide. System 100 includes a reactor 102, including a reaction vessel 104 (e.g., a reaction tube), a pellet source 106, an optional reactant gas source 108, an optional inert gas source 110, and a vacuum source 112. System 100 can also include a condenser 114, a purification apparatus 116, and/or a heat generation/recuperation apparatus 118. Exemplary systems can include any suitable number of reactors 102, pellet sources 106, reactant gas sources 108, inert gas sources 110, vacuum sources 112, purification apparatus 116, and heat generation/recuperation apparatus 118.

During operation of system 100, pellets from source 106 undergo a carbothermal reduction process to reduce material within the pellets. System 100 can be used to, for example, reduce metal oxides to metal and/or to produce ceramic materials, such as silicon carbide, tungsten carbide and boron carbide. Further yet, the combined reduction with carbon and nitridation with nitrogen or ammonia can be used to produce nitride non-oxide ceramics such as aluminum nitride and silicon nitride from metal oxide material contained in the pellets.

Reactor 102 is configured to operate at a pressure below atmospheric pressure to favor desired reactions at reduced temperatures, compared to the same reactions at higher pressures. By way of examples, reactor 102 is configured to operate at pressures of about 0.001 atm to less than atmospheric pressure, about 0.001 to about 0.5 atm, about 0.001 atm to about 0.1 atm, less than about 0.1 atm, or less than about 0.5 atm.

Reactor 102 can also be configured to operate as a moving bed or a pseudo moving bed reactor. In the case of a pseudo-moving bed reactor, the pellets can flow through the reactor (e.g., from the top to the bottom) at a controlled rate to hold the reactant materials at elevated temperatures for a residence time sufficient to substantially convert the metal oxide source into a gaseous state. The flow of pellets is generally is a direction that is different from the flow of gas (e.g., product gas). In the illustrated example, the pellets flow from a top of reactor 102 to a bottom of reactor 102 and can exit at the bottom of reactor 102, whereas the product gas (e.g., comprising CO and metal vapor) flows in an upward direction.

Reactor 102 can also include a heating apparatus 120. Heating apparatus 120 can include suitable heaters to rapidly heat vessel 104. By way of examples, the heating apparatus 120 can provide heat to vessel 104 (e.g., to an external surface of vessel 104) via one or more of concentrated solarthermal energy, electrical resistance, burning/combustion of gas (e.g., natural gas), other external heat source, or by a hybrid reactor comprising both solarthermal and another heat source, such as electrical resistance and/or gas combustion. Reactor 102 may suitably use electricity, natural gas combustion, or other external heat supply when not enough sunlight is available to provide sufficient heat for desired reactions in addition to or in lieu of solarthermal energy and can use only solarthermal energy when enough solar radiation is available to obtain a desired reaction temperature. Thus, reactor 102 can be configured as a solarthermal reactor, an electric reactor, a gas-combustion heated reactor, a hybrid solarthermal reactor, or other reactor in which sufficient heat is supplied to reaction vessel 104.

In accordance with various aspects of the exemplary embodiments, reactor 102 is configured to allow in situ separation of gaseous products (e.g., that contain desired metal(s)) from residual solid.

Reaction vessel 104 can be formed of any suitable material, such as refractory ceramic or other material that can withstand high temperatures such as graphite, silicon carbide, molybdenum silicide, zirconia or alumina. By way of examples, vessel 104 is formed of graphite.

Figure 5:
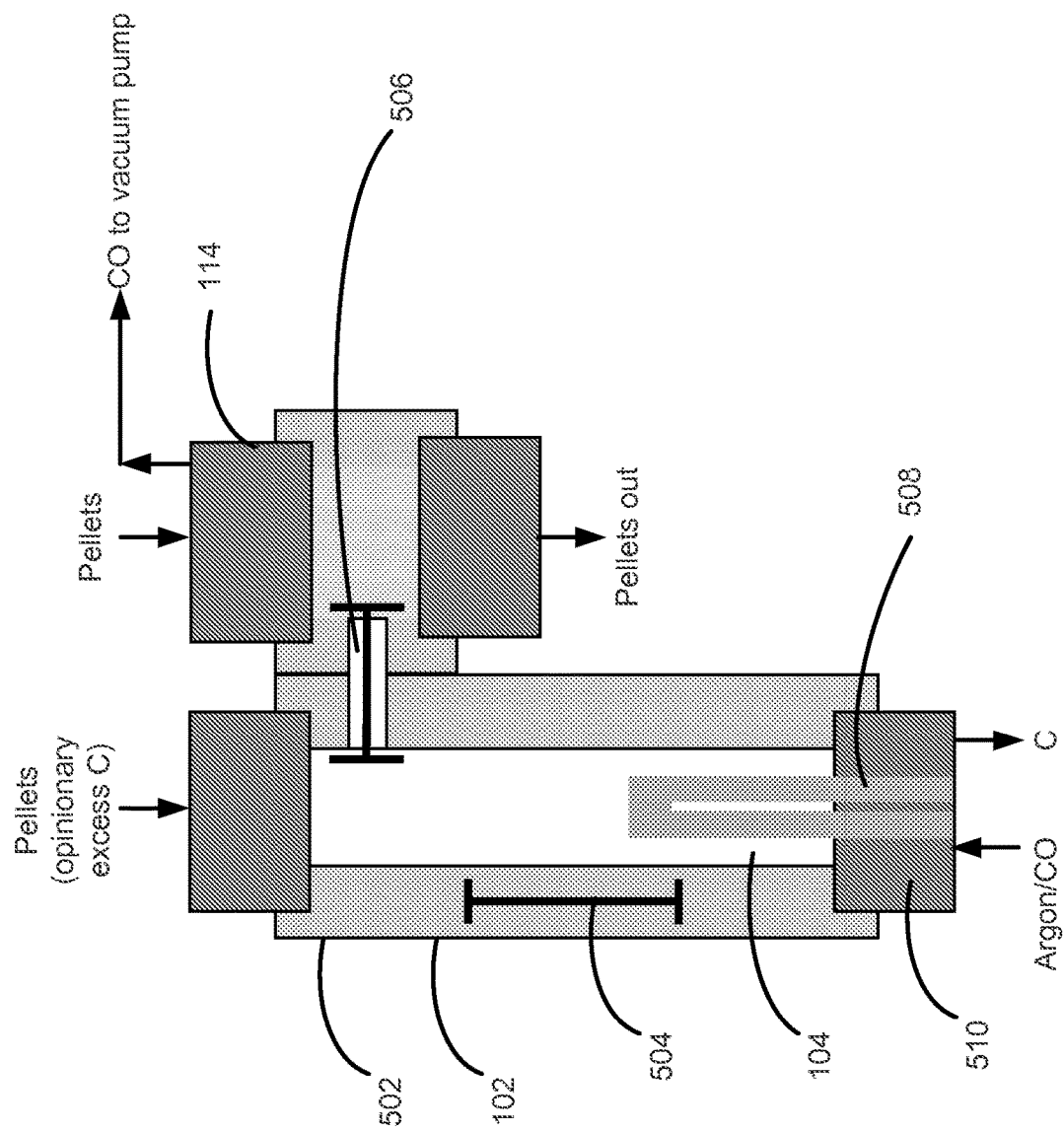
FIG. 5 illustrates an exemplary carbothermal reduction reactor and condenser in accordance with further exemplary embodiments of the disclosure.

FIG. 5 illustrates reactor 102 and condenser 114 in greater detail. In the illustrated example, reactor 102 includes a water-cooled (e.g., metal) outer jacket 502, a heater area 504 (e.g., up to about 2400° C.), which can be, for example, about 18 inches, a line 506 (e.g., formed of the same or similar material to vessel 104). Reactor 102 can also include a line 508, which in the illustrated example is a u-shaped line, to couple to, for example, heat generation/recuperation apparatus 118. Line 508 can be formed of, for example, alumina or other suitable material. Reactor 102 can also include one or more water cooled caps 510. During operation of reactor 102, carbon from the pellets can provide substantial surface area in order to promote rapid heating of and sufficient time for the metal oxide to react. Makeup C may also be fed as desired and the blanket CO gas inside of the reaction vessel(s) can be recycled. Metal vapor can be taken overhead with exiting CO and can pass through a condenser 114 in order to capture/condense the metal or other product(s). In the illustrated example, both ends of the reaction vessel employ star valves to enable reduced pressure operation and continuous addition/removal of solids. A gas outlet port, in the illustrated case, is a water cooled lance. The capture bed can be cooled using, e.g., liquid nitrogen flowing in a jacket or within vessels contained within the capture bed. The CO (e.g., pure) can pass through the "capture bed" and vacuum pump (e.g., turbine) where the CO can be blended with (e.g., pure)-H2—e.g., produced using an isothermal water splitting redox process operating at, e.g., 1500° C. An exemplary system and method for splitting water in accordance with various exemplary aspects of these embodiments is described in U.S. application Ser. No. 13/857,951, entitled METHODS AND APPARATUS FOR GAS-PHASE REDUCTION/OXIDATION PROCESSES, filed Apr. 5, 2013, the contents of which are hereby incorporated herein by reference, to the extent such contents do not conflict with the present disclosure. The redox reaction vessels can be situated within the pseudo-moving carbon particle bed which can provide for excellent particle/surface heat transfer to the redox reaction vessels. The reactor may be used to produce syngas having a molar Hz/CO: 2 which is suitable for liquid fuels synthesis. The carbon pellets can exit and heat can be recuperated in the form of steam generation used to feed the redox cycle and recirculating inert He that is used to sweep $O_2$ out during the redox reduction step. Inert He can be recycled once $O_2$ is removed using a high-temperature De-OXO ionic transport membrane that removes the oxygen from the inert He at 900° C. Any excess steam can be used for a Rankine cycle to generate electricity for powering the hybrid reactor off-sun and/or driving the vacuum pump. Inert carbon pellets can be recycled to the pseudo-moving bed.

Pellet source 106 includes pellets comprising material to be reduced. In accordance with various exemplary embodiments, pellet source 106 includes pellets that include a metal oxide (e.g., from a powder), a carbon source, and a binding agent. The metal oxide can be selected from the group of metal oxides having (a) thermodynamic favorability of reduction within the temperature range of 1000° C. to about 2400° C. under vacuum conditions below one atmosphere, below 0.5 atm, or less than 0.1 atm (or other reactor pressure ranges noted herein) and (b) a high vapor pressure, so as to facilitate separation of the reduced metal in vapor form in-situ from the solid reacting medium for subsequent condensation, collection, and optionally purification. Exemplary metal oxides suitable for use in systems and methods described herein include oxides of magnesium, zinc, manganese, aluminum, and any other metal or metalloid having relatively high vapor pressure upon carbothermic reduction. Pellet source 106 can desirably be configured to maintain the pellets at a high temperature (e.g., about 1500° C.).

Exemplary metal oxides have a primary particle size of about 325 mesh or <44 μm with a mean laser diameter of about 8-11 μm. Metal oxides preferably have small particle sizes down to 0.05 μm but beneficial to overall process economics is moderate particle sizes on the order of about 10 μm. The metal oxide powders may be of varying purity depending on the volatility of the impurities it is bound with in regards to their ease of carbothermic reduction and resulting vapor pressure. For instance, calcium and sodium oxides are known to form vapors during carbothermal reduction and may result in further energy intensive purification of the primary metal product. Preferably, the metal oxide powder has a purity >95% but could be as low as 60% if the main purity is a non-volatile metal or metalloid such as silica, zirconia, and, less preferably, alumina or iron oxide, which are known to be partially volatile. The metal oxides can comprise greater than about 60 wt %, or about 25 wt % to about 67 wt % of the pellet composition.

The carbon can be derived from a variety of sources and be comprised of either graphitic carbon, aliphatic carbon, or amorphous carbon and is preferably non-hydrogenated reactive carbon such as carbon black or other non-crystalline carbon. Specific examples of carbon sources include high purity petroleum coke such as that supplied by Superior Graphite (Chicago, Ill.) or high purity acetylene black C-100 supplied by Chevron, Corp. The carbon can comprise greater than about 70 wt %, or about 33 wt % to about 75 wt % of the pellet composition.

The binder material can be any solid hydrocarbon, carbohydrate, starch, or similar compound. By way of examples, a mixture of corn starch and wheat starch can be used where the, e.g., sole, monomer constituents are amylose and amylopectin. Essentially any charring material that forms a significant carbon matrix for increasing the pellet crush strength and also for modification of the pellet void fraction can be used. If a high weight percent of binder material is used, the pellet will undergo significant mass loss during pyrolysis and result in a highly porous pellet; conversely if a low weight percent of binder material is used, the pyrolytic conversion will be low and the char matrix may not be sufficient to increase the crush strength. A type of binder material can also affect the resulting char matrix and overall porosity and crush strength. For instance, a binder material of simple glucose can be used and pyrolyzed, resulting in denser pellets than the aforementioned desired use of starch. Starch, however, degrades completely at a slightly higher temperature than glucose and may incur a slightly larger energy penalty. By ways of example, the pellet composition can include about 5 dry wt % to about 40 dry wt %, about 10 dry wt % to about 30 dry wt %, or about 25 dry wt % binder material, such as corn and/or wheat starch.

Pellets for use in accordance with various embodiments of the disclosure can desirably withstand rapid heating rates, being exposed to heating rates up to $10^6$ K/s at the surface of the pellet. To 'withstand' rapid heating means to disallow the physical phenomena of thermal shock to significantly alter the pellet shape, porosity, or structural integrity. Pyrolysis of the binder material, described below, can result in the formation of a char network that stabilizes the pellets such that the pellets are resistant to crumbling, breaking, cracking, or disintegrating upon the initial rapid heating and not so far as to prevent these occurrences throughout the duration of reaction but for a sufficient amount of time so as to allow the reactants to convert to a desirable amount. Without the binder material, the reactant materials, being pelletized, are subject to crumbling and breaking, leading to entrainment of reactant solids with the product vapors and potentially clogging of downstream filters as well as contamination of the primary product. Continuous flow of reactant materials also becomes difficult to manage while it is probable that after significant conversion of reactant materials, the pellets will begin to disintegrate and crumble, in spite of the load of pellets continuously being added to the reacting medium. At the point where pellets begin to crumble and re-form their powder constituents, the flow of product vapors may be small enough so that entrainment of solids does not occur, to which it is considered a sufficient degree of conversion for the pellets to withstand thermal shock and the load of additional pellets.

Pellet crush strength (ASTM D4179) can be used to test whether or not thermal shock can be avoided. A desirable crush strength range can be between about 44 to about 222 Newtons or about 80 to about 100 Newtons. The pellets can lose significant mass as conversion increases and the pellet benefits from an initially higher crush strength under the weight of additional pellets. Pellets with crush strength below 44 Newtons are more likely to crumble and break apart during rapid heating.

Pellet porosity is a way to determine the mass transfer resistance to product vapors attempting to exit the pellet into the bulk fluid phase. Gases are desirably able to escape the pellet with relatively little resistance except that product gases may facilitate gas-solid reduction reactions of the metal oxide as in the case of magnesium oxide according to the following reaction scheme:

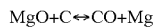

$$MgO+C \leftrightarrow CO+Mg$$

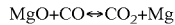

$$MgO+CO \leftrightarrow CO_2+Mg$$

In this case the local partial pressure of carbon monoxide gas may result in an increased kinetic rate for the reduction of magnesia. Accumulation of $CO_2$ within the pellet can result in the Boudouard reaction resulting in additional CO. Escape of $CO_2$ to the bulk fluid phase will likely lead to re-oxidation of the metal vapor as it condenses. An additional negative effect of too low of a porosity is the rapid accumulation of gases within the pellet and subsequent breaking apart of the pellet due to this large pressure gradient and force attributed to the rapid flow of gases escaping the pellet. Thus, there are both positive and negative effects attributed to mass transfer resistance as determined by pellet porosity. A desired porosity or void fraction range can range from about 2 to about 75% or about 10 to about 20%, as measured by, for example, ASTM D4641.

Use of pellets allows intimate contact points between reactant materials. Reactions cannot take place without physical contact between reacting molecules; therefore, solid-solid contact may desirably be initially primed for a desired reaction rate. In many cases of metal oxide reduction, the reactions are not solely solid-solid, but may also include gas-solid reactions. It may also be important, then, for the porosity of the pellets to be high enough to accommodate gaseous reactant materials to flow over pelletized solid reactant materials as in the case of re-circulating flow of the byproduct gas carbon monoxide in the carbothermal reduction of magnesium oxide. This third aspect to the goals of pelletization, then, becomes a function of both pellet crush strength and porosity as determined by the binder material, the fraction of binder material added to the overall mixture, and the conditions of pyrolysis for thermally degrading the binder material into a char matrix.

Optional reactant gas source 108 can include any suitable reactant. By way of example, reactant gas source 108 includes carbon monoxide (CO), methane (CH4), or other hydrocarbon gases.

Optional inert gas source 110 can include any suitable material that is gaseous or that becomes gaseous in reactor 102 and that substantially does not take part in a carbothermal reduction reaction. By way of examples, inert gas source 110 can include argon, nitrogen, methane, and/or hydrogen.

Vacuum source 112 can include any suitable vacuum source, such as a vacuum pump and/or a turbomolecular pump.

Condenser 114 can be used to collect and condense desired products from reactor 102. The condensate can be a liquid or solid, which can be collected on cold surface(s), such as metal pieces or pellets with or without the following supplements to cooling: (i) inert or compatible (e.g., $CH_4$, $H_2$) quench gas used to dilute products and aid in cooling, (ii) liquid injection spray on hot gases to aid in cooling, or (iii) rapid expansion of product gases. For example, the products can condense onto a relatively cold solid surface, such as a cooled surface of the same metal material being formed into pellets prior to contact with product vapors where the pellets are also flowing in order to collect the metal product continuously while preventing unfavorable condensation conditions attributed to heating of the cooled surface during condensation, such that there is a constant replenishing of cooled surfaces in the form of cooled metal pellets or pieces. The condensing apparatus can also prevent re-oxidation of the metal by the carbon monoxide (and potentially carbon dioxide) gas via rapid cooling under reduced pressures onto the cooled surfaces while also facilitating separation of the condensate from the carbon monoxide gas as the cooled metal pieces flow counter-currently to the byproduct gases.

Exemplary condensers described herein may be used in a variety of applications where one or more vapor products are desirably cooled to below either their boiling or melting point for a given pressure below atmospheric and greater than, for example, 0.1 mbar or 0.001 atm. The condenser, as well as the reactor described previously, is able to operate under vacuum conditions to facilitate efficient condensation of the primary product(s). Condenser 114 can be used for condensation and collection of metal vapors such as those produced via carbothermal reduction, and any other compound whose presence is a direct result of high temperature chemistry, resulting in the formation of a vapor or gas that is subsequently cooled.

As noted above, cooling or quenching of gases to remove a product that undergoes a phase change can be done in a variety of ways: mixing with a cold diluent gas for a rapid cooling rate and reduction in the partial pressure of oxidizing gases (e.g., CO to oxidize Mg(v)), facilitating flow over a relatively cold surface or surfaces in order to condense onto said surface(s), and rapid adiabatic expansion of the product gases. Each method has limitations and advantages that may or may not be conducive to a particular chemical reaction to take place in the aforementioned reactor system at high temperatures and reduced pressures. A diluent gas is desirably chemically inert to the product gases and desirably flows in sufficient quantities to rapidly cool the hot gas stream to prevent reversion reactions and byproduct chemistries. Exemplary suitable diluents include hydrogen, nitrogen (in some cases), methane or other gaseous hydrocarbons, and argon. Use of a diluent includes large flow rates compared to the hot gas stream and could result in nano- or microparticles that are pyrophoric and difficult to handle in order to eliminate the risk of spontaneous ignition. Diluent gases are generally expensive to generate and non-recyclable unless the byproduct gases are removed, representing additional costs. Cooling and condensing on a relatively cold surface could take place in the form of a rotating disk with heat transfer fluid flowing through it to maintain a specified temperature. This mechanism includes condensation onto particles such as in the case of a fluidized bed to increase gas-solid mass and heat transfer. The advantages here are rapid cooling while avoiding pyrophoric powder generation and expensive materials. Unfortunately, this method may result in difficult collection of the condensate since the primary products are typically separated from the surface(s) in order to regenerate the surface properties conducive to condensation. If the condensate is a liquid, then it would be easier to separate than if the condensate was a solid that is scraped off or removed by a mechanical device.

Below are exemplary embodiments of this aspect of the disclosure related to cooling product vapors, condensing the primary product, and collecting that product for possible refining or purification, all for the purpose of separating the desired product from undesired products and preventing undesired chemical reactions from taking place to an unacceptable conversion as dictated by market demands and energy requirements for refining and purification.

One exemplary embodiment of the disclosure is to flow cooled particles in a moving bed counter-currently (or in a different direction) to product gases in order to simultaneously quench hot gases and condense the primary product onto the cooled particle surfaces. In this case, the particles can be composed of the same material as the primary product, or of carbon whose presence retards the progression of reversion chemistries in the case of specifically carbothermal reduction reactions. By way of example, the particles are of the same material as the primary product condensate, and, in the case of magnesium, are maintained at a temperature below the melting point as hot gases are flowing over the particles, therefore the rate of the particle moving bed is desirably greater than the rate of heat transfer to heat the particles above about 650° C., the approximate melting point of magnesium, depending weakly on operating pressure. The presence of magnesium in the condensation of magnesium allows for thermodynamically favorable nucleation sites, and, depending on pressure, will facilitate either thin film or crystallite growth. At pressures below about 10 mbar, magnesium deposits as a film whereas above this pressure, the condensate was shown to grow as crystals. In this embodiment, the condensation of product vapors causes expansion of the byproduct gas carbon monoxide whose partial pressure will approach system pressure as condensation reaches completion. This rapid expansion causes cooling, partially absorbing the heat released upon phase change of the condensate, but also results in a rapid increase in partial pressure of the gas whose oxidizing properties may cause significant re-oxidation of the metal product, resulting in stratification of the product vapors as shown.

In another exemplary embodiment, a diluent gas flows counter-currently (or in a different direction) to the moving bed of cooled particles in order to maintain a constant partial pressure of the oxidizing byproduct gas. In this case, two modes of cooling are utilized; however the primary mode of cooling is via cooled surfaces to prevent pyrophoric powder generation. The purpose of the diluent gas is to prevent a dead-zone of by-product oxidizing gas near the outlet of the cooled particle moving bed. The diluent gas may enter the moving bed of cooled particles via the outlet valve in small quantities, so as to discourage expansive large volumes of diluent gas, or the diluent gas may enter at a point where the primary metal vapor has already condensed onto the cooled surfaces and flows some length before being introduced to the hot gas inlet.

Condenser 114 can include the third gas cooling method of rapid expansion as either a primary, secondary, or ternary mode of cooling. In a primary mode, the hot gas stream travels through a nozzle to facilitate rapid expansion of product vapors that is directly related to the ability of the device to cool the product gases and nucleate metal particles. This has been demonstrated by CSIRO in Australia and requires a substantial pressure drop and high energy use of a vacuum pump to generate the pressure drop, especially in a system where upstream the condenser, the pressure has already been reduced, plus the fact that clogging is an inherent problem. Thus, for use in a primary cooling sense, this is neither cost effective nor preventative of pyrophoric powders. As a secondary mode of cooling, a nozzle may be used, using substantially less of a pressure drop, to cool product vapors substantially below the point where gas-phase reversion occurs, or below about 1200° C. The remainder of cooling then takes place on a cooled surface for condensation of the metal product. However, the same drawback applies in that a large amount of energy is expended to create the pressure drop even though clogging of the nozzle may be avoided. As a ternary mode of cooling, the diluent gas is rapidly expanded, cooled, and mixed with the hot gas stream whereby condensation takes place on a relatively cold surface such as the moving bed of particles. In this case it is fairly easy to generate a large pressure drop of a diluent gas, especially a gas such as methane whose delivered utility pressure can exceed 100 psig. This method also prevents large volumes of diluent gas from being used as it is not the primary mode of cooling.

Another exemplary embodiment includes the rapid quenching of product gases below the temperature of significant rate of gas-phase reversion to temperatures that facilitate the condensation of the metal product into liquid form and continuous collection of liquid metal including the optional addition of a diluent gas to prevent liquid phase re-oxidation and reduction of the partial pressure of the byproduct oxidizing gas. Condensation of liquid magnesium metal can employ precise temperature control above about 650° C. and below about 1000° C. depending on the system pressure. In this scenario, the hot product gas stream is cooled to temperatures that allow liquid condensation of the metal product, minimal contact time between the byproduct gas and liquid metal, and continuous removal of liquid through a drain. The hot gas stream is cooled by any of the modes mentioned above. To condense a metal vapor, the condensing apparatus is at temperatures sufficiently low enough to be below the boiling point of the metal depending on system pressure, while also being able to remain sufficiently cool to remove heat due to heat of vaporization released upon condensation. Condensing a metal vapor also employs temperatures high enough to prevent solid condensation or formation of the metal product. Specifically a bubble cap plate could be used similar to those used in distillation columns, allowing for liquid condensation of the metal and continuous removal of the liquid product through a drain.

The modes of gas cooling mentioned above can be present as direct contact of hot gases onto a surface to form a liquid condensate and subsequent separation and draining via gravity. A diluent gas may also be added to prevent an oxidized layer from forming on the surface of the liquid condensate, lowering the partial pressure of the oxidizing byproduct gas. It is also possible to employ an adiabatic expansion nozzle whose operation has been tuned to form liquid droplets instead of solid particles.

FIGS. 7(A) and 7(B) illustrate a condenser 700 (suitable for use as condenser 114) in accordance with various exemplary embodiments. Condenser 700 includes cooled particles 702, a hot gas stream of reactants 704, and optionally a diluent gas inlet (not illustrated).

In the example illustrated in FIGS. 7(A) and 7(B), a moving bed of cooled particles 702 is used for collection of solid metal and separation from the oxidizing byproduct gas. Cooled particles 702 flow counter-currently to a hot gas stream 704. Star valves 706 at the top and 708 bottom of condenser 700 allow for reduced pressure operation and continuous addition/removal of solids. Holes in the bottom and top of the apparatus act as a gas inlet/outlet. Not shown is the method for cooling the particles, which occurs above upstream the particle inlet of the condenser. Particles 702 enter the condenser at temperatures ranging from 0° C. to 500° C. and may require use of a heat transfer liquid such as liquid nitrogen for cold temperatures or oil for high temperatures. The temperature of particles 702 implies a particular rate of the moving bed so that the particles do not reach their melting point at approximately 650° C. in the case of magnesium. Thus if the particles are sufficiently cold, the amount of material needed is less because the moving bed rate can be slower than if the particles are initially hot. However, the particle temperature affects condensation kinetics and the surface energy conditions required for rapid condensation. It has been shown that very cold surfaces lead to high surface area deposition and the potential for pyrophoric films. Higher temperatures lead to conformal film growth with low surface area and low reactive properties. The pressure of the condenser also affects condensation kinetics as well as the rate of the reversion reaction that is also related to the rate of cooling.

Purification apparatus 116 can include vacuum sublimation and re-condensation apparatus or common liquid/solid separation apparatus at temperatures above the melting point of the metal and below the boiling point.

Heat generation/recuperation apparatus 118 can include a "hercynite cycle" or redox reactor to, for example, form hydrogen or carbon monoxide, or both, that can (for the case of hydrogen) be blended with carbon monoxide produced from a carbothermal reduction reaction in the reaction vessel to produce syngas as one or more products of the reactor.

Exemplary system 100 may include one or more primary and/or one or more secondary solar concentrators (not illustrated) in order to increase solar concentration and, hence, temperature within the reactor.

Figure 2:
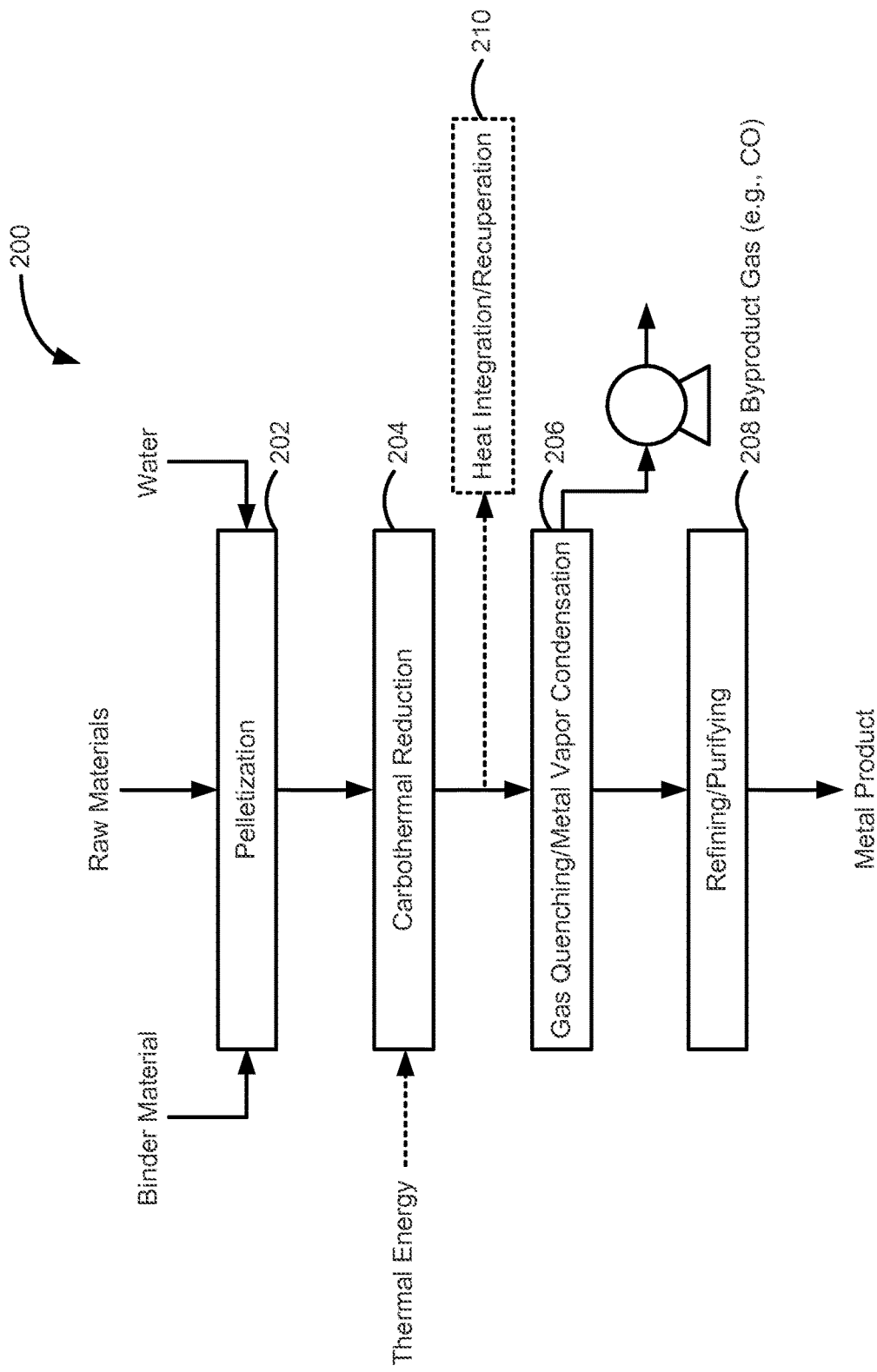
FIG. 2 illustrates an exemplary method for carbothermal reduction of material in accordance with exemplary embodiments of the disclosure.

Turning now to FIG. 2, a method 200 includes the steps of forming pellets (step 202), carbothermal reduction (step 204), condensing metal vapors (step 206), optionally refining/purifying product (step 208), and optionally integrating/recapturing heat and/or products (step 210).

During step 202, pellets for use in a carbothermal reduction process are formed. Preparation of the precursor pellets can include various steps of solid-solid mixing in either dry or slurry form, extrusion or formation into cylinders, disks or spheres, removal of moisture, and pyrolysis of the binder material as well as removal of other adsorbates. Pellet formation can be desirable: (1) to provide substantial protection from thermal shock due to rapid heating thus reducing physical contact between reactant materials, (2) to facilitate mass transfer of product vapors through a porous solid into the bulk fluid phase, and/or (3) to provide substantial physical contact of solid reactant materials to increase the reaction rate.

Figure 3:
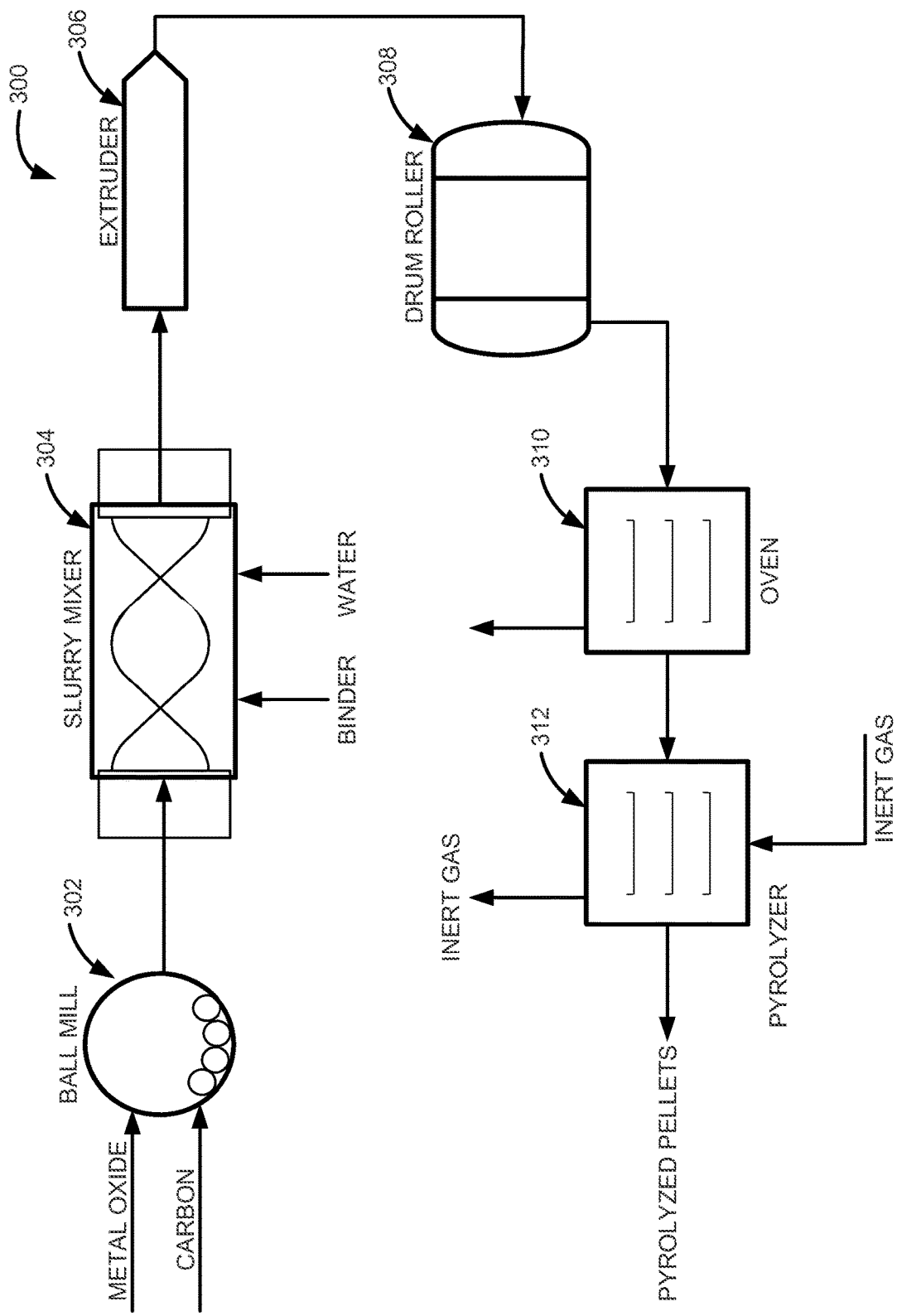
FIG. 3 illustrates a process for forming pellets in accordance with various embodiments of the disclosure.

FIG. 3 illustrates an exemplary process 300 for forming pellets suitable for use in various embodiments of the disclosure. In the illustrated example, the pellet constituents (such as those discussed above, viz., a metal oxide, carbon, and a binder) are mixed and milled together in a ball mill 302. The solid mixture is then used to form a slurry where water and the binding material are added, not necessarily at the same time. The solid binding material can be added during the step of milling. Slurry mixing takes place to ensure a thoroughly mixed solid matrix as well as to facilitate the formation of an extrudable paste. A slurry mixer 304 can include a ribbon blender or dough blender in order to prevent segregation of pellet constituents by density and size. An extruder 306 can use a die plate in conjunction with a die face cutter in order to form cylinders or disks from the extrudable paste. Spheres may also be formed in several ways: (a) placing cylindrical or disk-shaped pellets into a drum roller 308 to utilize pellet-pellet and wall-pellet contact for smoothing edges and forming spheres or close to spherical shapes; (b) extruding the reactant paste into shaped molds to be dried and/or pyrolyzed in the desired shape. Exemplary cylinders have a diameter dimension of about 5-10 mm and length of about 5-25 mm, and spheres with diameters of about 3-20 mm. The extruded pellets are known as 'green' pellets and can undergo mild heat-treatments of drying and pyrolysis of the binder material in an oven 310. Drying can take place in air at temperatures up to 150° C., so as to prevent oxidation of the carbon but high enough to remove the bound and free water from high surface area reactant constituents. Moisture content should be less than two weight percent or less than 0.5 wt %. A simple convection or forced air oven can be used for drying for a duration that sufficiently reduces the moisture content of the pellets. In a final step, pellets are pyrolyzed or calcined in a pyrolyzer 312 at temperatures up to 500° C. or in the range of about 300° C. to about 400° C., so as to fully pyrolyze the binder material and potentially aid in decomposition of hydroxides that may have formed during mixing with water. For instance, in the case of magnesium oxide, magnesium hydroxide can form on a high surface area, highly reactive magnesia precursor and decompose back to magnesium oxide at temperatures about 350° C. while simultaneously pyrolyzing the binder material, such that the hydrogen content of the pellet is <2 wt % and the oxygen content of the pellet not associated with the oxide reactant is also <2 wt %. Pyrolysis of the binder material implies thermal degradation into a char residue composed primarily of carbon. Binder materials can fully pyrolyze at different temperatures and heating rates. By way of examples, corn and wheat starch can be pyrolyzed at temperatures between about 250° C. and 350° C. The pellets are then ready for further processing in method 200.

Returning to FIG. 2, during carbothermal reduction step 204, pellets (e.g., formed using process 300) are provided to a carbothermal reduction reactor. The pellets are exposed to a reduction environment, such as a carbothermal reduction process. A flow of product gas is in a different direction (e.g., countercurrent) than the flow of the pellets. Heat can be supplied to a reactor during step 204 using, for example, any of the techniques described above.

At step 206, product(s) from step 204 are condensed. The condensed products can be in liquid or solid form. The condensed products are collected and can be further processed during step 208. The products can be condensed using any suitable condenser, such as the condensers described above in connection with FIG. 1. Excess gas (e.g., CO) can be separated from the product at this stage and recirculated and used for further processing, as discussed in more detail below.

If desired, the condensed product(s) can be purified during step 208. Exemplary purification techniques include vacuum sublimation or distillation at moderate temperatures near the boiling point of the metal, and barrier liquid-solid separations to remove solid carbon, oxide, and/or impurities that may have formed.

At step 210, waste heat from the process can be used to split water in order to produce hydrogen gas that can be combined with by-product carbon monoxide so that a synthesis gas can be made. The syngas can be converted to gasoline or diesel fuels through separate chemical processing. The product metal (e.g., Mg) can be used for the production of lighter weight cars and trucks, resulting in higher mileage vehicles. The production process will use less electricity and will release fewer greenhouse gases than other, typical processes, and at a lower cost.

Various embodiments of the disclosure relate to hybrid solarthermal reactors. The hybrid solarthermal reactors may suitably use electricity, gas (e.g., natural) combustion, or other external heat supply when not enough sunlight is available to provide sufficient heat for desired reactions. The reactors and systems described herein may be used for a variety of applications, including reduction of metal oxides with carbon (e.g., magnesium oxide and aluminum oxide) to form metals such as magnesium and aluminum or ceramics.

Even further, it is possible to use a hybrid solar/electric reactor operating 24/7 to pyrolyze or gasify biomass in the presence or lack of additive methane; or to thermally reduce an active metal oxide so that a subsequent oxidation reaction with water or carbon dioxide can be used to effectively split water or carbon dioxide producing hydrogen or carbon monoxide gas. It is also possible to crack methane, producing hydrogen and carbon black. Some of the reaction chemistries include:

$$MgO+C \rightarrow Mg+CO$$

$$2C+SiO2 \rightarrow SiC+2CO$$

$$7C+2B2O3 \rightarrow B4C+6CO$$

$$3C+Al2O3+N2 \rightarrow 2AlN+3CO$$

$$4C+WO3 \rightarrow WC+3CO$$

$$CH4 \rightarrow C+2H2$$

$$CHxOy+aCH4+(1+a-y)H2O \rightarrow (1+a)CO+(3a+0.5x-y+1)H2$$

Figures 4A, 4B:
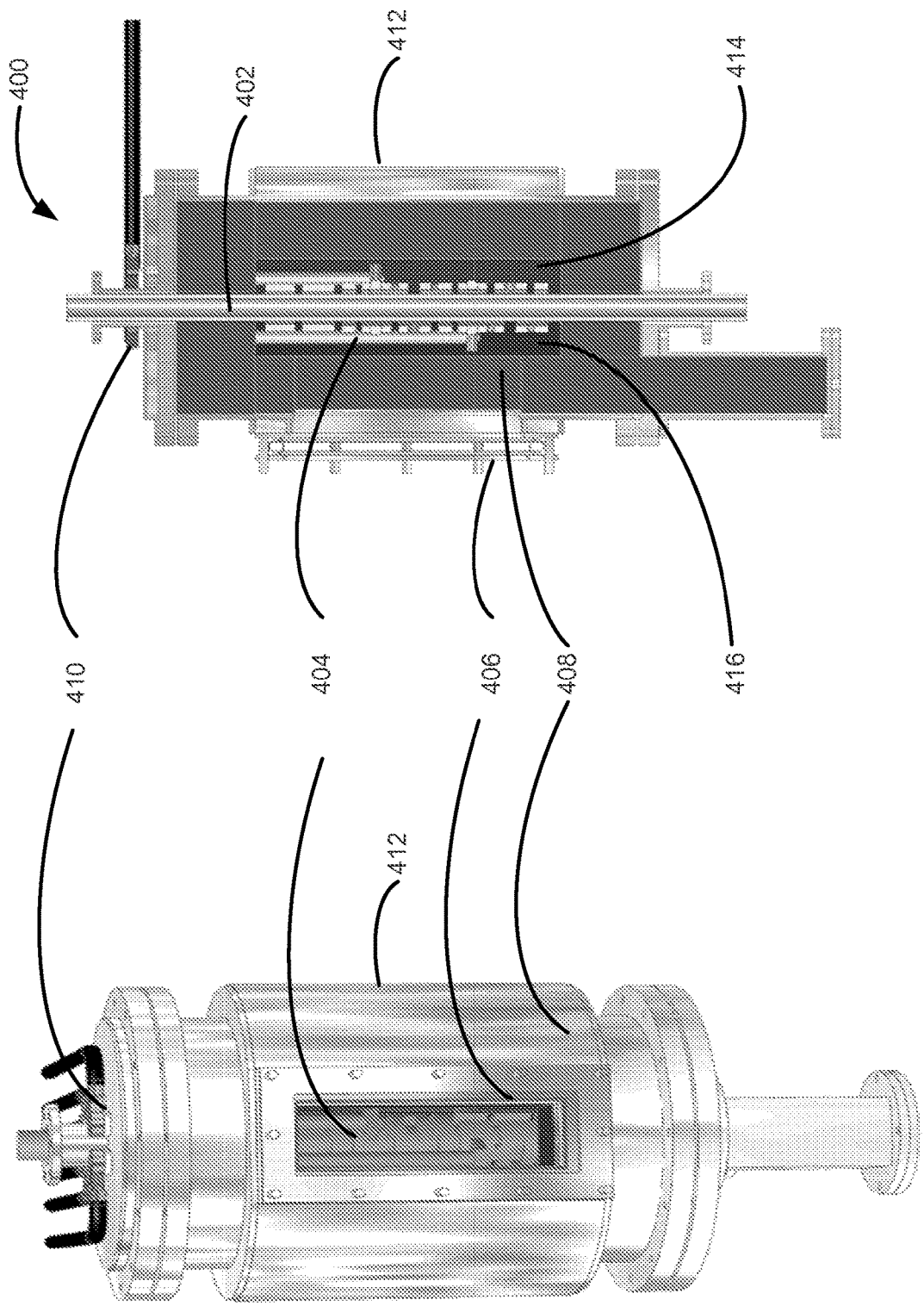
FIG. 4 illustrates an exemplary hybrid solarthermal reactor in accordance with further exemplary embodiments of the disclosure.

FIG. 4 illustrates an exemplary hybrid solarthermal reactor 400 in accordance with various embodiments of the disclosure. Hybrid solarthermal reactor 400 includes a reaction vessel 402, a heating element 404, a window or aperture 406, and insulation or insulating cavity 408. Various reactor 400 configurations can include a protective inert or compatible gas atmosphere within a solar receiver 412. Others do not.

In accordance with various exemplary embodiments of the invention, using a protective inert or compatible gas atmosphere within solar receiver 412, hybrid solarthermal reactor 400 includes: solarthermal receiver shell 412 comprising a window assembly (including window 406), reaction vessel 402, a sealed space 414 between an exterior of reaction vessel 402 and an interior of solarthermal receiver shell 412, and a resistive heating element 404. In accordance with another set of exemplary embodiments of the invention not requiring a protective inert or compatible gas atmosphere within the solar receiver, hybrid solarthermal reactor 400 includes: solarthermal receiver shell 412 without a window assembly, reaction vessel 402, a space 416 between an exterior of reaction vessel 402 and an interior of solarthermal receiver shell 412, and resistive heating element 404. As set forth in more detail below, exemplary reactors may not need a window or an inert gas when operating at continuous temperatures of about 1650° C. or less. In these cases, the reactor may include an area that is open to the atmosphere and the reaction vessel(s) and the resistive heating element(s) 404 may desirably be formed of material that is oxidation resistant under the reactor operating conditions.

While on sun, the surrounding heating elements 404 may be heated, with or without additional resistive heating, by direct solar radiation transmitted through a quartz window assembly, or, for the system operating below 1650° C., no window need be used, thus avoiding peak electricity usage cost and associated greenhouse gas generation. The solar receiver housing the reaction vessel can be an insulated (e.g., using graphite insulation for a closed window system or using alumina and zirconia for an air exposed cavity not containing a window) absorbing cavity that will provide substantial thermal mass, thus allowing for simplified temperature control since the process will have a "flywheel" type simplified temperature control when clouds pass by. The receiver can also be equipped with a retractable radiation shield that, e.g., protrudes between the quartz window and the inner cavity when off-sun in order to allow efficient resistive heating within the cavity.

Although illustrated with electric heating with electricity supplied at a contact 410, reactor vessel(s) 402 can be heated by the burning (combustion) of gas, such as natural gas, or other suitable means. For the case of gas combustion, the reactor vessel is desirably formed of a material that is compatible with combustion gases at high temperature, such as silicon carbide.

In the case of electrically heated reactors, resistive heating element 404 may form part or all of the reaction vessels or can surround the reaction vessels. Resistive heating element 404 may be formed of refractory material, such as molybdenum silicide, silicon carbide, or graphite (when an inert or compatible (non-oxidizing) gas is in the sealed space). Resistive heating element 404 can be composed of, for example, serpentine graphite, in which case the elements are able to conduct electricity, and can heat the reactor system via electrical resistance. The reaction vessel(s) may be placed concentrically inside the graphite electrodes/resistive heating elements.

In the case where heat is provided to the reacting medium by combustion of gas, a closed cavity contains natural gas igniters and burners and the composition of the cavity and reaction vessel are composed of oxidation resistant materials such as alumina, silicon carbide, or zirconia since natural gas combustion produces carbon dioxide and steam which both act as oxidizing agents at high temperatures. Any number of igniters/burners may be placed within the cavity around the reaction vessel so as to create conditions for uniform or close-to uniform heating of the reaction vessel. Natural gas combustion is known to achieve temperatures in excess of 2000° C. within the flame of said combustion and whose released heat may be transferred to the reaction zone of the hybrid reactor. Natural gas combustion can be used to augment or supplement another heating type (e.g., solarthermal, electrical resistance) or can be used as the sole means of heating such as at night when solarthermal energy is unavailable, allowing the reactor to operate continuously, 24/7, at high temperatures.

Any number of electrode-reaction vessel pairs may be positioned within the reactor cavity. Or, one (e.g., large) graphite electrode contains more than one reaction vessel. In another embodiment, the electrodes are solid rods and positioned throughout the cavity next to reaction vessels or the wall of the receiver.

Reaction vessel 402 may be formed of refractory material, such as graphite, silicon carbide, alumina, zirconia, molybdenum silicide, or coated graphite refractory materials such as silicon carbide coated graphite. Again, selection of graphite may be avoided when the reaction vessel is exposed to an oxidizing environment.

In accordance with various aspects of these embodiments, reactor 400 includes or is a moving bed reactor, a pseudo-moving bed reactor, or a transport vessel reactor. The reactor may additionally include a radiation absorbing thermal energy carrier, such as carbon particles, within the reaction vessel.

Reactor 400 can include one or more solarthermal receiver shells 412, each of which may comprise one or more materials selected from the group consisting of insulating materials, such as insulator 408 (e.g., graphite (e.g., when not exposed to an oxidizing environment), zirconia, silica, alumina), reflective materials, and solar radiation absorptive material. In accordance with further exemplary aspects of these embodiments, hybrid solarthermal reactor further includes a redox reactor vessel within the reaction vessel 402. Exemplary reactors 400 described herein can operate at temperatures ranging from about 1000° C. to about 2400° C.

In accordance with yet additional exemplary embodiments, a method includes the steps of providing a reactor, such as reactor 400, providing a feed stream, exposing the feed stream to a gasification or pyrolysis reaction within the reaction vessel to form one or more products, and exposing at least one of the one or more products to products of a water splitting or carbon dioxide-splitting process.

In accordance with other exemplary embodiments, a method includes the steps of providing a reactor as described herein, providing a feed stream comprising a mixture of metal (e.g., magnesium) oxide and carbon, and exposing the feed stream to intense heat so as to undergo a carbothermal reduction reaction within the reaction vessel to form one or more products including metal and carbon monoxide. In accordance with various aspects of these embodiments, the method further comprises a step of recycling one or more products, such as CO. In accordance with further aspects, the method further comprises a step of generating steam, which may be used to form electricity or for further redox reactions. At high enough temperatures, typically exceeding 1200° C. to 1400° C., it is also possible to drive an Air Brayton cycle to generate electricity. Various methods can further include a step of applying concentrated solar energy from one or more solar concentrators to one or more reactors.

Figure 6:
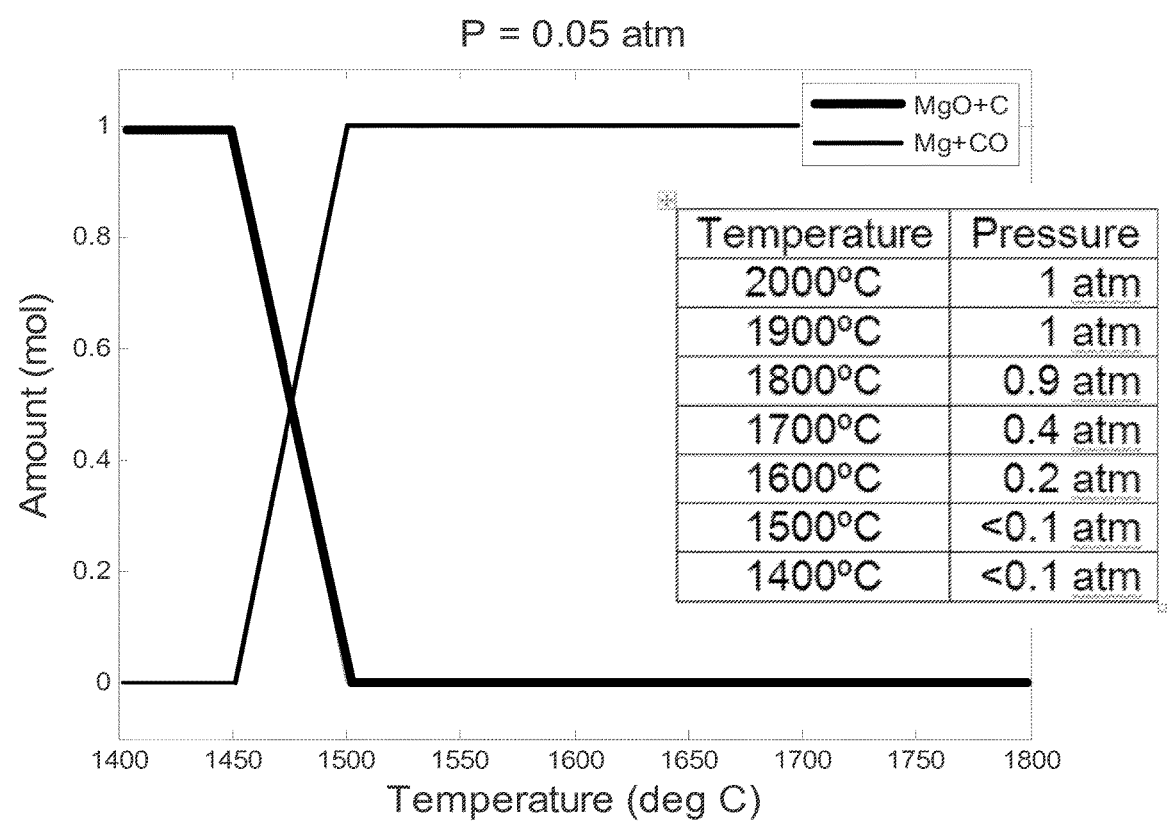
FIG. 6 illustrates free energy of a magnesium oxide/carbon system at varying pressures and temperatures.

As noted above, various methods, systems, and reactors can be used to reduce a variety of metal oxides. By way of example, FIG. 6 illustrates the carbothermal reduction synthesis of Mg(v) and byproduct CO(g) from C(s) and MgO(s), C(s)+MgO(s) à Mg(v)+CO(g), can be carried out at T<1500° C. while operating at a pressure P<0.05 atm (<38 Torr). FIG. 8 illustrates yield results for magnesium metal in a high temperature, reduced pressure reactor system at various pressures. FIGS. 9(a)-9(d) illustrate XRD results of magnesium metal obtained via carbothermal reduction in a reduced pressure solar-electric reactor condensed onto brass for various operating pressures.

Simplified calculations indicate that exemplary solarthermal hybrid systems and methods as described herein will easily meet one or more of the following three technical performance target levels: processing Energy Target (<27 kWh/kg Mg): ΔHr CTR (@25° C.)=about +7.29 kWh/kg Mg(=638 kJ/mol). In addition, to produce molar H2/CO=2 requires an energy content for water splitting: about 2(+3.73 kWh/kg H2O)(18 kg H2O/24.3 kg Mg): about +5.52 kWh/kg Mg. So, total idealized energy required for reaction: about 7.29+5.52: about +12.81 kWh/kg Mg. The solarthermal efficiency from a heliostat field to the receiver for a 1500° C. operating temperature is ~40%. Assuming that the efficiency for resistive heating is conservatively ~90%, then the energy input (without considering the internal efficiency of the process and with solarthermal operating 25% time) is about +(12.8/0.4)0.25+(12.8/0.9)(0.75:about 8.00+ 10.7=about +18.7 kWh/kgMg. If one assumes that the vacuum pump conservatively requires ~10% of the energy of the reactor and that the overall process efficiency is ~60%, then the total $E_{in}/M_{metal}$=about (+18.7+1.87)/0.6=about +34.3 kwh/kg Mg. As stated, if solarthermal energy provides power % of the time (25% on sun), then $E_{ren}/M_{metal}$=about (12.81/0.4)(0.25)/0.6: about 13.3 kWh/kg Mg. Hence, without even considering $E_{rec}$, the overall E=about 34.3 −13.3=about 21 kWh/kg Mg, exceeding the target. The CO2 Emissions Target, $XCO_2$=0 if nuclear electricity is used. If natural gas is used (499 mt $CO_2$/GWh), $XCO_2$~(10.7 kWh/kg Mg, reactor use+1.87 kWhr/kg Mg vacuum pump)(0.499 kg $CO_2$/kWh) ~6.26 kg $CO_2$/kg Mg. Hence, even when neglecting internal power recovery, $E_{rec}$, the $CO_2$ emissions target of <10 kg $CO_2$/kg Mg is met for using NG generated electricity. In considering the Cost Target, <$2.00/kg Mg, off-peak nuclear power at, for example, the Palo Verde nuclear plant outside of Phoenix, Ariz. averaged $0.01875/kwh in 2012. On peak cost averaged $0.0257/kWh in 2012. For (10.7+0.67(1.87)): 11.9 kWh/kg Mg required off peak and (0.33)(1.87): 0.62 kWh/kg Mg on-peak, the cost of electricity is (11.9)(0.01875)+(0.62)(0.0257): about $0.241 kg Mg for electricity, assuming no internal power recovery. The value of molar $H_2$/CO=2 syngas/kg Mg value will offset reactant cost as will internally generated power (which has been omitted from the above calculations). The capital cost of the heliostat field can be factored in to assess the capital investment of a mirror field and a tower on overall cost, but this is expected to be nowhere near $1.76/kg Mg, particularly when the value of the produced syngas is accounted for. Hence, a cost target of <$2.00/kg Mg will be met.

As calculations above illustrate, systems and methods in accordance with examples of the disclosure can provide substantially lower energy usage, cost and lower greenhouse gas emissions relative to current electrolytic processes. The ability to couple redox water splitting with a hybrid solar/electric carbothermal reduction process, and to produce 1.32 kg of molar $H_2$/CO=2 syngas/kg Mg in the process, is highly desirable. The present disclosure provides reactors and systems that: (1) have the ability to operate a (e.g., hybrid solar/electric) reactor at between 1000° C. and 2400° C. with integrated redox water splitting and (2) to do so with a refractory reaction vessel operating at less than 0.05 atm to atmospheric pressure or slightly above. The present disclosure can be used for chemical processing that extends far beyond light metals and into all areas of chemical processing where on-sun solar is limiting—e.g., solar biomass/coal gasification, redox water/$CO_2$ splitting, other carbothermal reduction processing such as that to produce non-oxide ceramic powders including SiC, Si3N4, WC, B4C, AlN, TiB2, etc.

As noted above, various embodiments of the invention include a reactor with a closed cavity (also referred to herein as a solarthermal receiver shell) to house the reaction vessels and electrodes (also referred to as resistive heating elements) while protecting the electrodes/resistive heating elements from oxidation, or, with suitable refractory materials that can be heated in the presence of oxygen. Inert gas such as nitrogen, argon, helium, or the like can be circulated within the sealed cavity to prevent or mitigate oxidative gases from entering for the case of a windowed receiver. The cavity can be similar to those found in solarthermal reactors in that it may be constructed of any common reactor material such as steel and that the reactor includes a window (typically constructed of quartz or sapphire) or array of windows through which concentrated solarthermal energy can pass and so that gases being exchanged are reduced, preventing or mitigating air from entering the cavity. Secondary concentrators may also be positioned on the outside of the windows. As noted above, the windows or window assemblies may include a retractable radiation shield to prevent re-radiation when the reactor is using electrical resistance heating—e.g., at night. This shield can also be used to regulate the temperature of the reactor system when solar-thermal energy is in use. The cavity can be composed of one or more concentric materials, such that the outer material is exposed to the air and the inner materials are insulating, reflective, or absorptive with respect to solar rays, In accordance with various embodiments of the disclosure, solarthermal energy can be initially concentrated by, for example, an array of heliostats (primary concentrators) directed toward a cavity or window. The reactor system can be constructed on a central tower receiver to which the heliostats direct sunlight. A secondary concentrator may be present on the outside of the reactor cavity to funnel rays efficiently through the cavity window. The concentrated solar energy enters the cavity and can be directed to the reaction vessels via re-radiation from the cavity wall and electrodes. If the reaction vessel is opaque to radiation, energy can be transported via conduction though the reaction vessel wall to the reacting medium. If the reaction vessel is transparent to radiation, energy may be transported via conduction and radiation to the reacting medium. The reacting medium can be heated by conduction, convection, and/or radiation from the inner wall of the reaction vessel.

SPECIFIC EXAMPLES

The following non-limiting examples illustrate various methods, reactors, and systems in accordance with exemplary examples of the disclosure. These examples are merely illustrative, and it is not intended that the disclosure be limited to the examples. Systems in accordance with the present invention may include the components listed below as well as additional and/or alternative components.

Example 1

Powdered magnesia (Martin Marietta Corp., 98% purity) with an average particle size of 9 m was mixed with acetylene black (C-100, Chevron Corp.) in a ball mill for 4 hours with magnesium metal milling media. To the mixture, a 2:1 corn-to-wheat starch blend was added at approximately 20 wt %. Distilled water was added slowly and constantly while in a bench-top mixer to a total amount of about 2× the mass of the solid mixture. Mixing took place for approximately 1 hour or until a viscous paste formed. The paste was scooped into an extruder and sent through a die plate to form cylinders approximately 10 mm in diameter. The cylinders were sliced to form pellets approximately 10 mm long. Pellets were loaded onto a quartz boat and placed inside a horizontal tube furnace. The furnace was operated at 150° C. for two hours. After drying, the pellets were placed in a second horizontal tube furnace. The tube was sealed and nitrogen gas was used to purge the system of oxygen at a rate of initially 2 SLPM then reduced to 1 SLPM after oxygen reached levels below 100 ppm. The pyrolysis furnace was operated at 250° C. for 200 minutes not including ramp-up and cool-down rates of 5 K/min. Pellets were removed from the pyrolysis furnace and placed in a lock hopper above a high temperature reactor system. The pellets were fed into the high temperature reactor system at a pressure of 10 mbar and temperature of 1450° C., and reacted in batch mode. Pellets were initially loaded into a staging chamber above the reactor system that was also under reduced pressure by a leaky ball valve. The ball valve was opened to allow the pellets to be gravity-fed into the reaction tube. The reactor system included a graphite heating element for electrical resistance heating, a graphite crucible approximately 42" long and a 2" inner diameter, and a water cooled lance outlet placed directly above the uniformly hot reaction zone of the crucible. An Adixen ACP 28 vacuum pump was placed downstream of the lance with a particle filter installed at the pump inlet. An MKS T3BiB smart throttle was used in conjunction with two MKS baratrons and a LabView interface to control pressure within the system also with the use of argon gas used to help sweep product gases through the system. System temperature was measured by a Type-B thermocouple placed on the outer wall of the crucible as well as a dual-wavelength pyrometer. The time of reaction was approximately 50 minutes and a conversion of about 80% was reached based on residual oxygen content determined by LECO combustion analysis as well as ICP-OES for atomic magnesium content. Magnesium metal was condensed on the inside of the water-cooled lance that was coated in either magnesium foil or carbon foil. Magnesium metal yields were determined by the integrated concentration of carbon monoxide gas as well as via chemical reaction of the condensate with hydrochloric acid to measure total hydrogen evolved. Yield was on the order of 65-75%.

Example 2

Pellets were prepared in the same manner as Example 1 except that the ratio of carbon-to-magnesia was varied. Pellets exposed to a reactor temperature above about 1400° C. and therefore surface heating rates on the order of $10^4$ K/s maintained their size and shape without cracking or crumbling with a minimum C:MgO ratio of 1.2. Cracking and crumbling occurred over the course of conversion except in cases of C:MgO greater than 3 where pellet size and shape was maintained but crush strength was diminished to below 10 Newtons. Pellets with excess carbon content demonstrated a faster rate of reduction, probably due to increased grain boundary interactions. However, yield of metal product did not seem to be affected.

Example 3

Pellets were prepared in the same manner as Example 1 except that the ratio of magnesia-to-carbon was varied by varying the amount of starch added as well as the pyrolysis temperature. Increasing pyrolysis temperature leads to complete pyrolysis of the binder material, in this case starch. At slow heating rates, the volatile content of corn starch is about 80%, meaning that the amount of fixed carbon is 20% of the added starch. The amount of starch pyrolyzed leads to differences in porosity and crush strength. At 250° C., approximately 60% of the volatile matter has evolved; at 450° C., 100% of the volatile matter is removed. The volatile matter is composed of nearly all of the oxygen and hydrogen contained within the starch. Experiments at 1450° C. and 10 mbar in a batch reactor show no statistical difference in reactivity with starch content of pyrolysis temperature. Added starch of less than 5% affects thermal shock resistance where particles subjected to temperatures above 1400° C. were easily cracked, probably due to rapid accumulation and release of gases. Increased starch content and increased pyrolysis temperature led to increased porosity and a complex relationship with crush strength. High starch content and low pyrolysis temperatures led to high crush strengths but high starch content and high pyrolysis temperature led to lower crush strength. In general, the carbon-to-magnesia ratio was a function of the initial ratio of raw materials added, amount and type of binder material added, and pyrolysis temperature.

Figure 9:
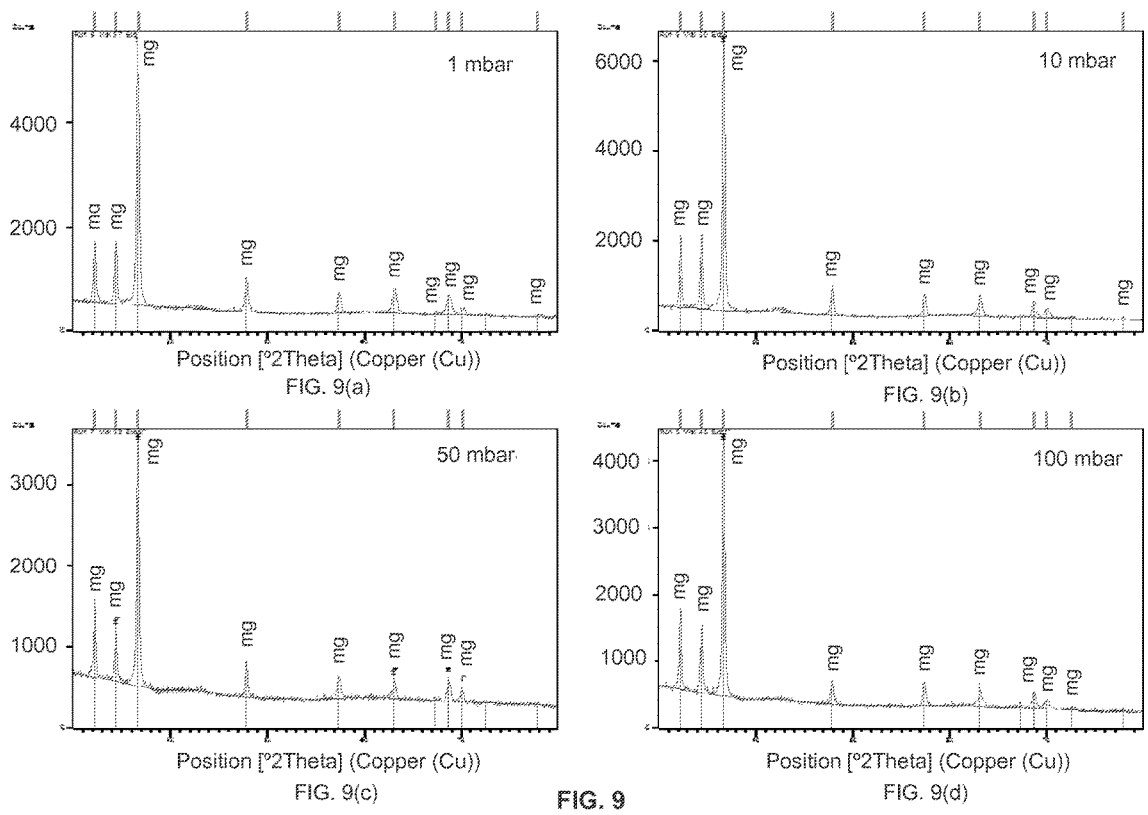

FIGS. 8 and 9 illustrate some of the results of magnesium metal yield and purity for various pellet compositions and system pressures. In the illustrated examples, temperature had minimal effect on yield but did affect reduction conversion rate.

Example 4

Pellets were prepared in the manner described in connection with Examples 1-3 but were sent through a continuous moving bed reactor system illustrated in FIG. 5, where thermal energy was provided solely by electrical resistance. Additionally, the condensing apparatus illustrated in FIG. 7 was used to continuously remove condensate in solid form on pre-formed magnesium particles. The moving bed reactor system is the same as that described in Example 1, except for the water-cooled lance and the addition of two rotating star valves were installed at the top and bottom of a silicon carbide reaction vessel to continuously add pellets by gravity from the top and remove residual solid material out the bottom while maintaining pressures below 500 mbar down to 1 mbar using an Adixen ACP 28 vacuum pump. Continuous removal of product gases occurred out the top of the reaction vessel on a shared cap that included the pellet inlet. The rate of pellet addition is dependent on reaction rate as determined by reactivity of the magnesia powder, carbon type, carbon-to-magnesia ratio, temperature, and pressure. A series of experiments were previously conducted to determine vessel fill rate for the following conditions: MAGOX Super Premium (Premiere Magnesia), acetylene black C-100 (Chevron Corp.), C:MgO=3.6, T=1450° C., P=10 mbar. A single batch of about 3 kg of pellets was initially loaded into a staging area above the moving bed reactor, and above a leaky rotating valve so that the staging vessel was also under reduced pressure. The reaction vessel was also pre-loaded to a 50% fill level with inert carbon pellets. The feed rate of the pellets was approximately 1 kg/hr and a rate of removal of residual material of about 0.2-0.5 kg/hr in order to maintain a relatively constant fill level of about 80% and conversion on a MgO basis above 90%.

The moving bed condenser was operated in a similar manner to the reduction reactor volume. A fixed amount of magnesium particles (1 kg) were loaded into a lock-hopper above a rotating valve. The magnesium particles were kept at room temperature and fed into the condenser apparatus at a rate of about 0.6 kg/hr. The rate of removal was controlled by a sonic level indicator so the condenser remained about 85% full of pellets. The temperature of the gases at the inlet of the condenser was about 1350° C. and the outlet of carbon monoxide gas was about 350° C. The pellets reached a temperature close to 600° C. at a maximum. Yield of magnesium metal product was in about 75%.

Although exemplary embodiments of the present disclosure are set forth herein, it should be appreciated that the disclosure is not so limited. For example, although the methods and reactor systems are described in connection with various specific configurations, the disclosure is not necessarily limited to these examples. Various modifications, variations, and enhancements of the exemplary systems and methods set forth herein may be made without departing from the spirit and scope of the present disclosure.

The subject matter of the present disclosure includes all novel and nonobvious combinations and subcombinations of the various systems, components, and configurations, and other features, functions, acts, and/or properties disclosed herein, as well as any and all equivalents thereof.

The invention claimed is:

1. A condenser comprising:
a housing having an interior volume, a first end and a second end opposite the first end, the housing comprising:
a first inlet at the first end of the housing to receive a moving bed of particles flowing in a first direction through the interior volume of the housing of the condenser;
a second inlet to the housing to receive a stream comprising gaseous metal flowing in a second direction different than the first direction through the interior volume of the housing;
a first outlet at the second end to dispense the particles and condensate material condensed on the particles from the interior volume of the housing; and
a second outlet to remove gasses from the interior volume of the housing, the second outlet operably connected to a vacuum source; and
a temperature controller operably coupled to the housing and configured to maintain temperature of the particles at the first inlet to below a boiling point of the metal.

2. The condenser of claim 1, wherein the housing further comprises a diluent inlet.

3. The condenser of claim 1, configured to operate at sub-atmospheric pressure due to removal of gasses by the vacuum source.

4. The condenser of claim 1, further comprising a cooling source proximate the first inlet external to the housing.

5. The condenser of claim 1, further comprising a heating source proximate the first inlet external to the housing.

6. The condenser of claim 1, configured to provide the condensate material as a liquid.

7. The condenser of claim 1, configured to provide the condensate material as a solid.

8. The condenser of claim 1, configured to inhibit oxidation of metal as the metal condenses onto the moving bed of particles.

9. The condenser of claim 1, configured to utilize a metal that comprises magnesium.

10. The condenser of claim 1, wherein the second inlet for the stream comprising gaseous metal is operably connected to a carbothermal reactor.

11. The condenser of claim 1, configured so that the moving bed of particles comprises a metal to be condensed from the stream comprising gaseous metal.

12. The condenser of claim 1, configured so that a rate of the moving bed of particles is maintained to maintain the temperature of the moving bed of particles at a desired temperature.

13. The condenser of claim 1, configured to control a partial pressure of an oxidizing gas.

14. The condenser of claim 1, wherein the temperature controller is further configured to maintain temperature of the inner walls of the housing to above the boiling point of the metal.

* * * * *